June 2, 1925.
L. ROBERTS
1,540,570
CLAMP FOR CONCRETE FORMS
Filed March 23, 1925
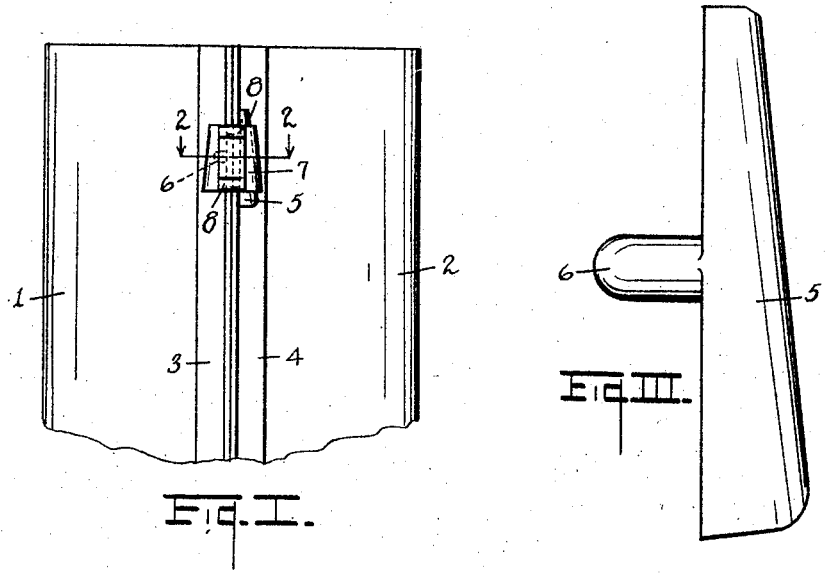
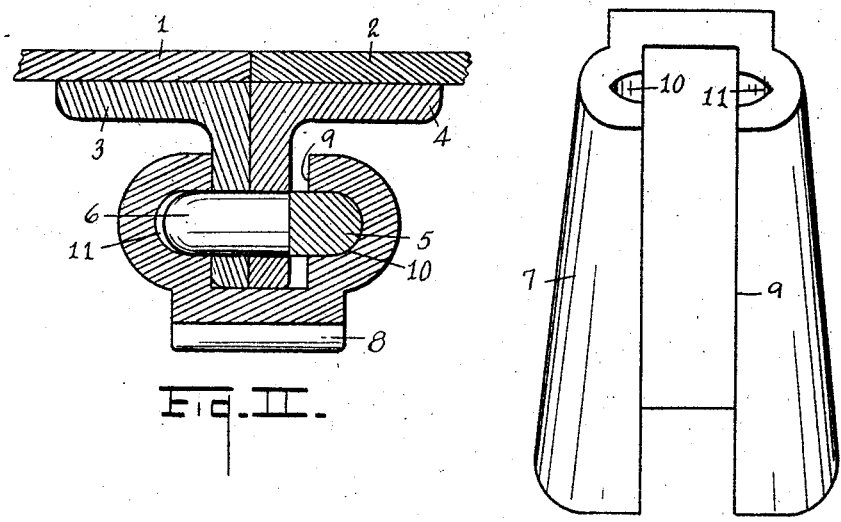
Inventor
Lud Roberts
Attorneys Patented June 2, 1925.

1,540,570

UNITED STATES PATENT OFFICE.

LUD ROBERTS, OF JACKSON, MICHIGAN, ASSIGNOR TO JACKSON REINFORCED CONCRETE PIPE CO., OF JACKSON, MICHIGAN.

CLAMP FOR CONCRETE FORMS.

Application filed March 23, 1925. Serial No. 17,603.

*To all whom it may concern:*

Be it known that I, LUD ROBERTS, a citizen of the United States, residing at the city and county of Jackson, State of Michigan, have invented certain new and useful Improvements in Clamps for Concrete Forms, of which the following is a specification.

This invention relates to an improved clamp for concrete forms or molder's flask or the like.

The main object of the invention is to provide such a structure which is simple and economical to produce and strong in use and which can be quickly applied and removed.

Objects relating to details and economies of construction and operation will appear from the detailed description to follow.

I accomplish the objects of my invention by the devices and means described in the following specification. The invention is defined and pointed out in the claims. A structure which is a preferred embodiment of the invention is illustrated in the accompanying drawing, forming a part of this application, in which:

Fig. I is a view of one of my improved clamps in position on the flanges of a concrete pipe mold.

Fig. II is an enlarged detail transverse sectional view taken on line 2—2 of Fig. I.

Fig. III is an enlarged detail plan view of the internal wedge member with its locating dowel pin.

Fig. IV is a detail perspective view of the keeper wedge piece.

In the drawing the sectional view in taken looking in the direction of the little arrows at the ends of the section line and similar numerals of reference refer to similar parts throughout the several views.

The parts will be referred to by their numbers. 1 and 2 are the parts of a pipe mold. The parts joined may be considered as the parts of a molder's flask. 3, 3 are the flange bars for connecting the same, which are perforated at 4. The flanges may be of any desired construction. 5 is the internal wedge piece with a dowel 6 for engaging the registering perforations 4 in the flanges. 7 is the keeper wedge piece with transverse lugs 8 to facilitate driving off and on. This keeper is recessed at 9 to engage over the opposed flanges and has longitudinal tapering slots 10 and 11 to engage the wedge part 5 and to accommodate the projecting end of the pin 6 and engage the same for perfect alinement of the flanges on a form or flask. The pin 6 is inserted and the inner wedge portion is put in place and the keeper wedge piece is then placed over the flanges and driven to place, in the manner indicated in the drawing.

To remove the same it is only necessary to drive the keeper piece in the opposite direction, when all parts are at once released.

I have shown my invention in its simplest form. The structure will be very effective with a plurality of the engaging pins on the inner wedge piece. Any engaging device may be provided. I desire to claim the specific device and also the invention broadly, as pointed out in the appended claims.

Having thus described my invention, what I claim as new and desire to secure by Letters Patent is:

1. The combination with the retaining flanges of a flask or mold, with corresponding perforations, of a wedge member to co-operate therewith, having a dowel pin to engage the said perforations, and a keeper recessed to engage over the said flanges and having tapering longitudinal grooves to accommodate the said wedge and engage the dowel, coacting as specified.

2. The combination with the retaining flanges of a flask or mold, with corresponding perforations, of a wedge member to co-operate therewith, having a dowel pin to engage the said perforations, and a keeper recessed to engage over the said flanges and having tapering longitudinal grooves to accommodate the said wedge, coacting as specified.

3. The combination with the retaining flanges of a flask or mold, of a wedge member to co-operate therewith, with means to engage the said flanges, and a keeper recessed to engage over the said flanges and having tapering longitudinal grooves to accommodate the said wedge, coacting as specified.

In witness whereof, I have hereunto set my hand and seal.

LUD ROBERTS. [L. S.]